United States Patent
Brueck et al.

(10) Patent No.: US 9,394,818 B2
(45) Date of Patent: Jul. 19, 2016

(54) DELIVERY UNIT FOR A LIQUID ADDITIVE, METHOD FOR OPERATING A DELIVERY UNIT AND MOTOR VEHICLE HAVING A DELIVERY UNIT

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 72 days.

(21) Appl. No.: 13/786,606

(22) Filed: Mar. 6, 2013

(65) Prior Publication Data
US 2013/0232957 A1    Sep. 12, 2013

(30) Foreign Application Priority Data
Mar. 7, 2012    (DE) .......................... 10 2012 004 726

(51) Int. Cl.
| | |
|---|---|
| F01N 3/00 | (2006.01) |
| F01N 3/02 | (2006.01) |
| F01N 3/10 | (2006.01) |
| F01N 3/20 | (2006.01) |
| F01N 3/08 | (2006.01) |

(52) U.S. Cl.
CPC ................ *F01N 3/08* (2013.01); *F01N 3/2066* (2013.01); *F01N 2610/01* (2013.01); *F01N 2610/1406* (2013.01); *F01N 2610/1433* (2013.01); *F01N 2610/1466* (2013.01); *F01N 2610/1473* (2013.01); *F01N 2610/1493* (2013.01); *Y02T 10/24* (2013.01); *Y10T 137/0318* (2015.04); *Y10T 137/794* (2015.04); *Y10T 137/86131* (2015.04)

(58) Field of Classification Search
USPC ..................................... 60/286, 295, 301, 324
See application file for complete search history.

(56) References Cited

U.S. PATENT DOCUMENTS

| | | | |
|---|---|---|---|
| 5,189,876 A |  | 3/1993 | Hirota et al. |
| 2005/0252201 A1* | | 11/2005 | Lecea et al. ..................... 60/286 |
| 2011/0113765 A1* | | 5/2011 | Bruck et al. .................... 60/303 |

(Continued)

FOREIGN PATENT DOCUMENTS

| | | |
|---|---|---|
| DE | 102007011686 A1 | 9/2008 |
| DE | 102008000932 A1 | 10/2009 |

(Continued)

OTHER PUBLICATIONS

Machine Translation DE 10 2009 011 018 done Nov. 12, 2014.*

*Primary Examiner* — Audrey K Bradley
*Assistant Examiner* — Dapinder Singh
(74) *Attorney, Agent, or Firm* — Laurence A. Greenberg; Werner H. Stemer; Ralph E. Locher

(57) ABSTRACT

A delivery unit for a liquid additive includes a first pump with a first suction port and a first pressure port, a second pump with a second suction port and a second pressure port, and a feed device. The feed device is connected to the first pressure port through a first line system and the first suction port is connected to a tank for the liquid additive through a second line system. The second pressure port is connected to the tank through a third line system and the second line system and the third line system are separated from one another. A method for operating a delivery unit and a motor vehicle having a delivery unit are also provided.

12 Claims, 1 Drawing Sheet

(56) References Cited

U.S. PATENT DOCUMENTS

| | | |
|---|---|---|
| 2011/0232267 A1 | 9/2011 | Brück |
| 2012/0031073 A1* | 2/2012 | Grater .............................. 60/274 |
| 2013/0276430 A1* | 10/2013 | Ulrich et al. .................... 60/274 |

FOREIGN PATENT DOCUMENTS

| | | | |
|---|---|---|---|
| DE | 102008022991 A1 | | 11/2009 |
| DE | 102008063488 A1 | | 6/2010 |
| DE | 102009011018 A1 | | 9/2010 |
| DE | 102011002425 | * | 1/2011 |
| DE | 102009029534 A1 | | 3/2011 |
| WO | 2008110407 A1 | | 9/2008 |
| WO | 2009121644 A1 | | 10/2009 |
| WO | 2012093051 A1 | | 7/2012 |
| WO | 2013029849 A1 | | 3/2013 |

* cited by examiner

DELIVERY UNIT FOR A LIQUID ADDITIVE, METHOD FOR OPERATING A DELIVERY UNIT AND MOTOR VEHICLE HAVING A DELIVERY UNIT

CROSS-REFERENCE TO RELATED APPLICATION

This application claims the priority, under 35 U.S.C. §119, of German Patent Application DE 10 2012 004 726.6, filed Mar. 7, 2012; the prior application is herewith incorporated by reference in its entirety.

BACKGROUND OF THE INVENTION

Field of the Invention

The invention relates to a delivery unit for a liquid additive. The delivery unit is, in particular, suitable for delivering a liquid additive into an exhaust-gas treatment device of an internal combustion engine. The invention also relates to a method for operating a delivery unit and a motor vehicle having a delivery unit.

In the automotive field, in particular, widespread use is made of exhaust systems of internal combustion engines into which a liquid additive (oxidizing agent and/or reducing agent) is fed. An exhaust-gas purification method commonly performed in exhaust-gas treatment devices, specifically in the case of diesel engines, is the selective catalytic reduction (SCR) method in which nitrogen oxide compounds in the exhaust gas are reduced with the aid of a reducing agent. In that case, ammonia is used as a reducing agent. Ammonia is preferably stored in motor vehicles not as ammonia itself but rather in the form of a reducing agent precursor solution which can be converted to form ammonia. A suitable reducing agent precursor solution is an aqueous urea solution, which is available for example under the trademark AdBlue® with a urea content of 32.5%. The reducing agent precursor solution can be stored in a motor vehicle as a liquid additive and supplied to an exhaust-gas treatment device through the use of a delivery unit.

The delivery unit required for that purpose should be as inexpensive and reliable as possible. In particular, the delivery unit should be constructed in such a way that the amount of liquid additive provided by the delivery unit can be determined and/or dosed as precisely as possible.

Furthermore, it is a problem that liquid (in particular aqueous) additives can freeze at low temperatures. The described aqueous urea-water solution AdBlue® freezes, for example, at temperatures of approximately −11° C. The delivery unit should therefore be constructed in such a way that it is not damaged by freezing liquid additive.

Furthermore, it should be ensured, in particular, upon the start of operation of the delivery unit that there are no air bubbles in the delivery unit, because air bubbles in the delivery unit can adversely affect the function and/or dosing precision of the delivery unit.

Additionally, a reliable and precise provision of liquid additive should be possible as quickly as possible after the start-up of the delivery unit (after/upon the starting of a motor vehicle).

SUMMARY OF THE INVENTION

It is accordingly an object of the invention to provide a delivery unit for a liquid additive, a method for operating a delivery unit and a motor vehicle having a delivery unit, which overcome the hereinafore-mentioned disadvantages and at least partially solve or alleviate the highlighted problems of the heretofore-known methods, units and vehicles of this general type. It is sought, in particular, to specify a particularly inexpensive, precise and robust delivery unit for a liquid additive and a method for operating the delivery unit.

With the foregoing and other objects in view there is provided, in accordance with the invention, a delivery unit for a liquid additive, comprising a first pump with a first suction port and a first pressure port, a second pump with a second suction port and a second pressure port, and a feed device. The feed device is connected to the first pressure port through a first line system and the first suction port is connected to a tank for the liquid additive through a second line system. The second pressure port is connected to the tank through a third line system and the second line system and the third line system are separated from one another.

The delivery unit for a liquid additive is, in particular, constructed in such a way that it can be used for the delivery of a reducing agent or a reducing agent precursor and, in particular, of an aqueous urea solution. The delivery unit is, in particular, also constructed in such a way that it can be integrated into a motor vehicle.

The delivery unit may be constructed in such a way that precise dosing of the liquid additive can be performed simply through the operation of the first pump. The delivery unit may also be constructed in such a way that the first pump serves merely to build up a predefined pressure of the liquid additive in the first line system, and the precise dosing of the liquid additive is then performed through the use of the feed device which has, for example, an injector operated in an electromagnetically controlled manner, wherein the supplied amount of liquid additive can be precisely determined through the use of a predefinable opening time of the injector.

The pumps are preferably pumps which operate in a pulsed manner and which have at least one outlet valve and, if appropriate, additionally an inlet valve and a pump chamber. The delivery of liquid additive in the pump or through the pump is effected by a movement of a movable pump element (piston, diaphragm, etc.) in the pump chamber. The movable pump element pushes the liquid additive out through an outlet valve. The first pump preferably has a first electric drive. The second pump preferably has a second electric drive. The pumps are preferably driven by their respective electric drives. An electric drive may be a rotary drive or a linear drive. A rotational movement generated through the use of a rotary drive may be transmitted to a piston or a diaphragm of the pump by a transmission device (for example a connecting rod or a cam disc). An electric drive typically has at least one electric coil which generates a magnetic field when a current flows through. The magnetic field exerts a force on an armature of the drive, in such a way that the armature performs a drive movement.

The first pump serves, in particular, for the "regular" delivery of liquid additive to the metering device, and therefore preferably has a longer service life and/or higher delivery capacity than the second pump. The second pump preferably serves merely for delivering the liquid additive back through the third line system in order to at least partially drain and/or purge and/or flush the various line systems (the first line system, the second line system and/or the third line system) and, in particular, in order to convey air bubbles out of at least one of the line systems. Therefore, during the operation of the delivery unit, the second pump is usually operated less frequently than the first pump, and may therefore have a shorter service life and/or lower delivery capacity.

The first pump and the second pump suck in liquid additive in each case at their suction port, whereas the liquid additive is provided or discharged at elevated pressure at their pressure port. The various line systems are formed, for example, in the manner of hoses and/or in the manner of ducts. The ducts may, for example, be formed by bores and/or closed cavities in a block of a delivery unit and/or by tubes. The line systems are, in particular, durable with regard to the delivery of aqueous urea solution and may be at least partially heated (actively and/or in a controlled manner).

The proposed delivery unit is, in particular, distinguished by the second line system and the third line system being separate from one another. In particular, there is no separate path and/or duct, through which the liquid additive can pass, between the second line system and the third line system. This also means, in other words, that the liquid additive can be delivered from the second line system into the third line system only through the first line system or the tank. Liquid additive that is situated in the second line system can preferably pass into the third line system only through the first pump, the first line system and the second pump. Liquid additive that is situated in the third line system can preferably pass into the second line system only through the tank. Through the use of such a configuration, it can be ensured that, with a form of circulation of the liquid additive through the second line system, the first line system and the third line system (in this sequence), an air bubble situated in one of the three line systems is reliably conveyed back into the tank for the liquid additive. This is achieved, in particular, by the "recirculated" or "unguided" conveyance of the liquid additive in the pump and/or in the tank.

The second line system and the first line system together form a (direct) delivery line for the liquid additive from the tank to the feed device. The third line system forms a type of return line through which the delivery line (or the second line system and the first line system) can be partially or even completely ventilated/emptied. For this purpose, the first line system has, in particular, a branch leading to the second pump. The first line system thus preferably has a total of three ends. A first end is connected to the first pressure port of the first pump. A second end is connected to the second suction port of the second pump. A third end is connected to the feed device.

The delivery unit may be constructed as a delivery module which is integrated into the tank. The delivery unit may also be an external delivery unit situated outside a tank. The second line system is then preferably constructed as an intake line which includes a suction tube through which the liquid additive can be extracted from the tank. The third line system, which constitutes a type of return line, issues into the tank separately from the second line system.

In accordance with another preferable feature of the delivery unit of the invention, the second line system is separated from the tank by a filter. When liquid additive is sucked out of the tank through the second line system by the first pump, the (recirculated) liquid additive is preferably (forcibly) sucked through the described filter. The filter may, for example, be formed as a type of fabric and/or as a nonwoven which surrounds a suction point on the second line system. There is, in particular, also no flow path, which bypasses the filter, for the liquid additive from the third line system to the second line system. The filter may, from one point of view, be considered to be a separating element between the third line system and the second line system. Furthermore, the filter is likewise constructed to be resistant to the additive and, if appropriate, also (electrically) heatable. In this case, the filter not only prevents undesired particles from being sucked in but also prevents the ingress of (relatively large) air bubbles which (have been recirculated and which) pose a risk to the functionality of the delivery unit.

In accordance with a further particularly preferable feature of the delivery unit of the invention, the first line system is provided with a pulsation damper. Such a pulsation damper may serve to reduce pressure fluctuations which are generated in the first line system by the first pump or by the delivery movement of a movable pump element of the first pump. The pulsation damper may be constructed as a movable and/or compressible element which is provided on and/or in the first line system.

In accordance with an added advantageous feature of the delivery unit of the invention, the first pump is constructed to act as a valve. During the operation of the delivery unit, liquid additive for an exhaust-gas treatment device is provided (for example in the manner of a pressure accumulator in the first line system), wherein the second pump is then normally deactivated. The second pump has, in particular, (only) the task of purging the delivery unit or the line systems of the delivery unit. The second pump is therefore preferably deactivated when no purging operation is taking place. In order to avoid a loss of delivery capacity as a result of a (leakage) flow of the liquid additive through the third line system, the path from the first line system into the third line system should be closed by the second pump in this phase. The second pump thus acts as a (shut-off) valve. Therefore, as a result of the second pump which is constructed in this way, no additional valve is required in the connection from the first line system to the third line system.

In accordance with an additional advantageous feature of the delivery unit of the invention, the second pump separates the first line system and the third line system from one another in a direction from the second suction port to the second pressure port when the pump is deactivated. It is preferable for no electrical energy to be required for the second pump to act as a separator or a valve. It is rather the case that, when the pump is deactivated, a flow path from the first line system into the third line system is closed in a fluid-tight manner.

In accordance with yet another advantageous feature of the delivery unit of the invention, the second line system and the third line system each have a hose line and the lines are connected to a tank. Hose lines are advantageous, in particular, if the delivery unit is mounted outside a tank. The hose line, which is a constituent part of the second line system, preferably then also forms a type of suction pipe through which liquid additive can be extracted in the vicinity of a base of the tank for the liquid additive. It can thus be ensured that the liquid additive present in the tank can be delivered out of the tank as completely as possible by the delivery unit. The (flexible) hose lines may furthermore also at least partially accommodate a volume expansion of freezing additive situated therein, and/or be constructed to be heatable.

With the objects of the invention in view, there is also provided a method for operating a delivery unit as described herein according to the invention. The method comprises at least the following steps:
a) simultaneous operation of the first pump and of the second pump for the purpose of purging the first line system, the second line system and the third line system;
b) deactivation of the second pump in order to end the purging process; and
c) operating the first pump in order to dose or meter liquid additive through the feed device.

During step a), a circulation of liquid additive through the three line systems back into the tank for the liquid additive preferably takes place. In particular, the purging constitutes a ventilation process in which air bubbles can be transported out of the three line systems (into the tank). Step a) may, for example, be performed upon the start of an activation of the delivery unit and/or upon a specific initiation. It is possible, therefore, for a process for determining the proportion and/or the distribution of air bubbles in at least one of the line systems to be performed previously, and for step a) to be initiated if air bubbles are detected.

As a result of the deactivation of the second pump in step b), the first line system is preferably separated from the third line system. The second pump then acts as a valve. A circulation of liquid additive is then no longer possible. Step b) may, for example, be initiated after a predefined time period following the start of step a). The process for determining the proportion and/or the distribution of air bubbles in at least one of the line systems may then be performed again if appropriate. If undesired air bubbles are then still detected, step a) may also be (multiply or suitably) repeated. A switchover may otherwise be made to "regular" operation.

In step c), the liquid additive is dosed through the feed device. The feed device preferably includes an injector, wherein the supplied amount of liquid additive is precisely controlled, and thus dosing can be performed, through the use of the opening time (which is predefined in a controlled manner) of the injector. The dosed amount of liquid additive preferably corresponds precisely to the amount of liquid additive that is delivered by the first pump during step c). In this case, the second pump normally remains deactivated.

In accordance with another particularly advantageous mode of the method of the invention, during step a), liquid additive is dosed through the feed device. In the preferred method variant, a purging operation through the three line systems and also a dosing operation of liquid additive, for example into an exhaust line, take place in parallel in step a). This is possible by virtue of the fact that the delivery rate of the first pump and the delivery rate of the second pump can be determined precisely by monitoring the respective operating parameters. The difference between the delivery rate of the first pump and the delivery rate of the second pump then constitutes the dosed amount of liquid additive. Through the method implementation, it is possible for the dosing operation of the delivery unit to not have to be interrupted during a purging process. This also makes it possible for step a) to be performed during "regular" operation without an uncontrolled (imprecise) delivery of liquid additive to the tank and/or to the exhaust line taking place, which is a significant advantage of the device.

The special advantages and structural features highlighted with regard to the described delivery unit can be applied and transferred correspondingly to the described method. The same applies to the particular advantages and embodiment features specified with regard to the described method, which can be applied and transferred correspondingly to the described delivery unit.

With the objects of the invention in view, there is concomitantly provided a motor vehicle, comprising an internal combustion engine, an exhaust-gas treatment device for purifying exhaust gases of the internal combustion engine, and a feed device provided at the exhaust-gas treatment device. A liquid additive can be dosed into the exhaust-gas treatment device by the delivery unit described herein through the feed device.

The described delivery unit in the motor vehicle is, in particular, also constructed and set up or configured to be operated by using the methods described herein. For this purpose, the motor vehicle preferably has a control unit in which corresponding program routines are stored. The invention permits, in particular, the dosed metering of aqueous urea solution into an exhaust-gas treatment device of the motor vehicle, in such a way that the SCR method can be performed in an effective manner therein.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being specified.

Although the invention is illustrated and described herein as embodied in a delivery unit for a liquid additive, a method for operating a delivery unit and a motor vehicle having a delivery unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
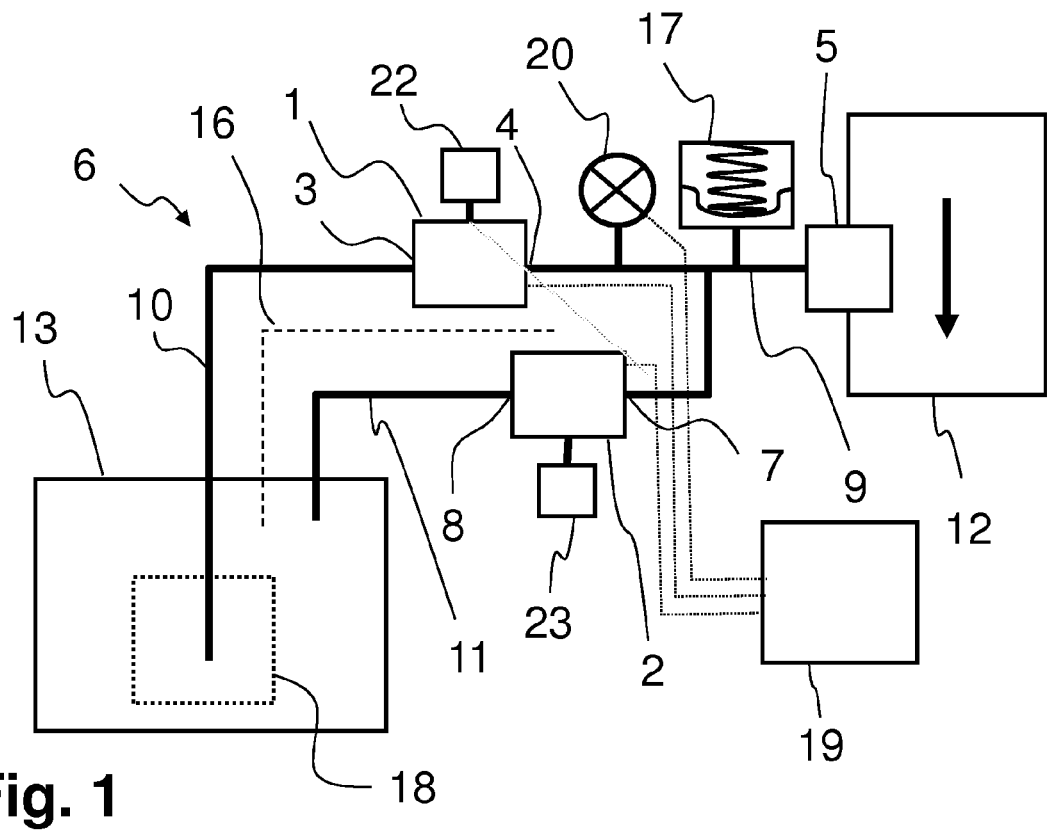
FIG. 1 is a block diagram of an exemplary embodiment of a delivery unit according to the invention.

Referring now to the figures of the drawings in detail and first, particularly, to FIG. 1 thereof, there is seen a delivery unit 6 for delivering a liquid additive, in particular an aqueous urea solution. The delivery unit 6 has a first line system 9, a second line system 10 and a third line system 11. The second line system 10 and the first line system 9 are connected to one another through a first pump 1. The second line system 10 is connected to a first suction port 3 of the first pump 1. The first line system 9 is connected to a first pressure port 4 of the first pump 1. Furthermore, there is a second pump 2 which is connected to the first line system 9 and to the third line system 11. The first line system 9 is connected to the second pump 2 through a second suction port 7. The third line system 11 is connected to the second pump 2 through a second pressure port 8. The first pump 1 has a first electric drive 22 and the second pump 2 has a second electric drive 23. A feed device 5 is also connected to the first line system 9. A liquid additive can be supplied into an exhaust-gas treatment device 12 by the feed device 5. The second line system 10 and the third line system 11 are each connected to a tank 13.

Furthermore, the second line system 10 and the third line system 11 are separated from one another by a fluidic separator 16. No connection exists between the second line system 10 and the third line system 11 outside the tank 13. The second line system 10 is preferably furthermore separated from the tank 13 by a filter 18. Liquid additive which is to be suctioned from the tank 13 into the second line system 10 must therefore pass through the filter 18. A pulsation damper 17 is also provided on the first line system 9. Pressure fluctuations which are generated in the first line system 9 by the first pump 1 can be compensated by the pulsation damper 17. A sensor 20 for determining pressure and/or temperature, for example, is also disposed on the first line system 9. The first pump 1, the second pump 2 and the sensor 20 are connected to a control unit 19 which is configured to predefine operation of the delivery unit 6.

Figure 2:
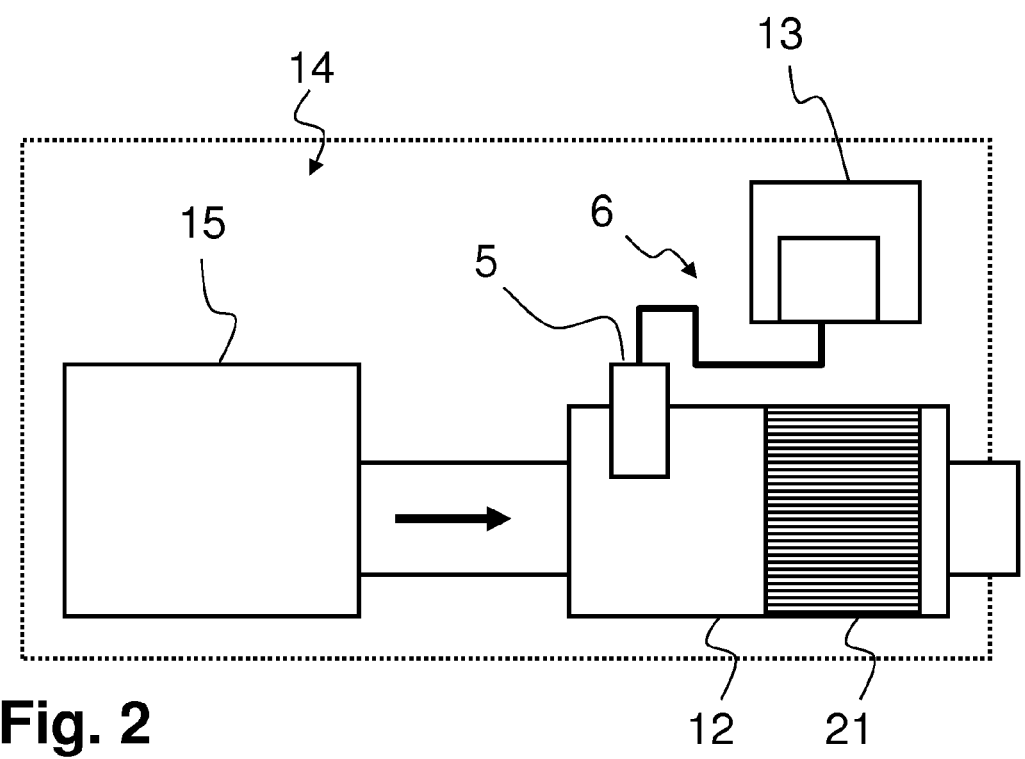
FIG. 2 is a diagrammatic, vertical-sectional view of a motor vehicle having the described delivery unit.

FIG. 2 shows a motor vehicle 14 having an internal combustion engine 15 and having an exhaust-gas treatment device 12 for the purification or cleaning of exhaust gases of the internal combustion engine 15. Liquid additive can be fed into the exhaust-gas treatment device 12 by a delivery unit 6. The delivery unit includes a feed device 5 through which the liquid additive is supplied to the exhaust-gas treatment device. The delivery unit 6 delivers the liquid additive out of a tank 13. It is thus possible, in particular, for an aqueous urea solution to be fed, in particularly precise doses, to an SCR catalytic converter 21 in the exhaust-gas treatment device 12.

The invention claimed is:

1. A delivery unit for a liquid additive, the delivery unit comprising:
   first, second and third line systems;
   a first pump with a first suction port and a first pressure port;
   a second pump with a second suction port and a second pressure port;
   a feed device connected through said first line system to said first pressure port, said first line system connected through said second suction port to said second pump;
   a tank for the liquid additive;
   said first suction port connected through said second line system to said tank;
   said second pressure port connected through said third line system to said tank; and
   said second line system and said third line system being separated from one another, said first pump having a first electric drive and said second pump having a second electric drive.

2. The delivery unit according to claim 1, which further comprises a filter separating said second line system from said tank.

3. The delivery unit according to claim 1, which further comprises a pulsation damper provided for at least said first line system.

4. The delivery unit according to claim 1, wherein said second line system and said third line system each have a hose line connected to said tank.

5. The delivery unit according to claim 1, wherein said second pump is connected between said first line system and said third line system.

6. The delivery unit according to claim 1, wherein said second pump is constructed to act as a valve.

7. The delivery unit according to claim 6, wherein said second pump separates said first line system and said third line system from one another in a direction from said second suction port to said second pressure port when said second pump is deactivated.

8. A method for operating a delivery unit, the method comprising the following steps:
   providing a delivery unit according to claim 1;
   a) simultaneously operating said first pump and said second pump to purge said first line system, said second line system and said third line system;
   b) deactivating said second pump to end said purging step; and
   c) operating said first pump to dose liquid additive through said feed device.

9. The method according to claim 8, which further comprises dosing liquid additive through the feed device during step a).

10. A motor vehicle, comprising:
    an internal combustion engine;
    an exhaust-gas treatment device configured to purify exhaust gases of said internal combustion engine;
    a delivery unit according to claim 1; and
    a feed device disposed at said exhaust-gas treatment device, connected to said delivery unit and configured to dose liquid additive from said delivery unit into said exhaust-gas treatment device.

11. A delivery unit for a liquid additive, the delivery unit comprising:
    first, second and third line systems;
    a first pump with a first suction port and a first pressure port;
    a second pump with a second suction port and a second pressure port;
    a feed device connected through said first line system to said first pressure port, said first line system connected through said second suction port to said second pump;
    a pulsation damper provided for at least said first line system, said pulsation damper being provided directly upstream of said feed device;
    a tank for the liquid additive;
    said first suction port connected through said second line system to said tank;
    said second pressure port connected through said third line system to said tank; and
    said second line system and said third line system being separated from one another, said first pump having a first electric drive and said second pump having a second electric drive.

12. The delivery unit according to claim 11, wherein said second pump is connected between said first line system and said third line system.

* * * * *